Figure 1:
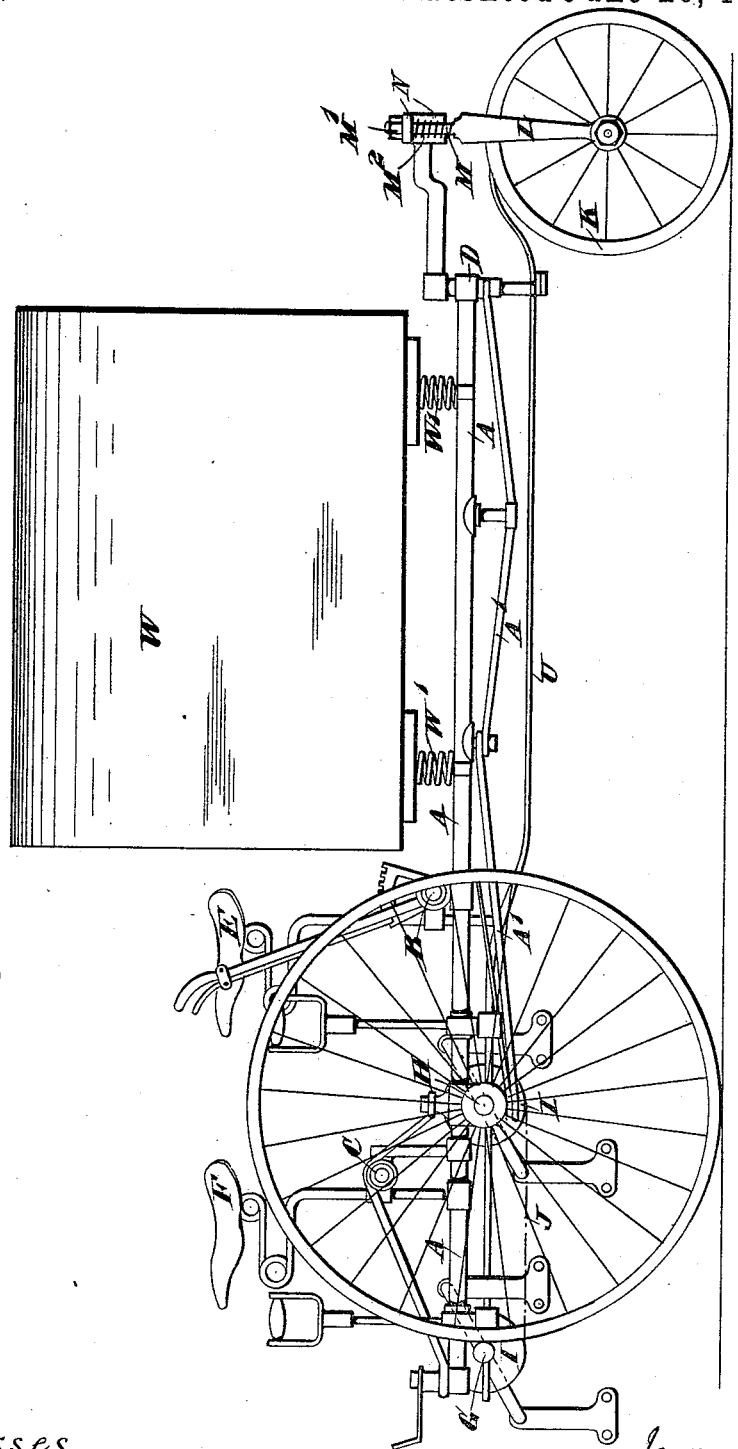

(No Model.)

J. WARRICK.
CARRIER CYCLE.

No. 499,810.   Patented June 20, 1893.

Witnesses
James Miller
Albert Edward Ellen

Inventor
John Warrick
by his attorney
George Henry Rayner

United States Patent Office.

JOHN WARRICK, OF READING, ENGLAND.

CARRIER-CYCLE.

SPECIFICATION forming part of Letters Patent No. 499,810, dated June 20, 1893.

Application filed May 31, 1892. Serial No. 435,004. (No model.)

*To all whom it may concern:*

Be it known that I, JOHN WARRICK, cycle-manufacturer, a subject of the Queen of Great Britain and Ireland, residing at St. Mary's Butts, Reading, in the county of Berks, England, have invented certain new and useful Improvements in Carrier-Cycles, of which the following is a specification.

This invention relates to that class of cycles specially adapted for carrying goods of various kinds, and has for its objects to provide a cycle which shall be capable of safely supporting a greater weight than has hitherto been carried by such cycles, and improved steering apparatus for such cycle. The seat of the present driver is situated about midway between the driving axle of the two front wheels and the carrying receptacle behind. I propose to carry a tubular frame forward of the two front driving wheels and upon a transverse part of the frame I support a seat facing the same way as the present driver. At the end of this projecting frame I mount cranks and pedals and connect them to the driving axle of the front wheels by means of chain gearing or any other suitable device. In order that greater strength and stability may be obtained, I provide two steering wheels at a little distance from each other, each capable of revolving separately, but having their forks rigidly connected together. A rod at the top of each fork passes through a cross-piece, being loosely attached thereto by a nut on top and a strong spiral spring, bearing on the upper part of the fork, thus allowing the forks to give vertically. A rod at the center of this cross piece extends through the two cross pieces connecting the forks and the axles of the steering wheels, having a collar a little below the upper crossbar. Two spiral springs are situated around this rod, one between the upper cross piece and upper connecting bar and the other between the collar and the bar connecting the axles. This rod is connected to another rod at top by means of a knuckle joint, the second rod turning in bearings in the ends of the frame. The steering rod is connected to one of the forks, turning the wheels on the central bearing above mentioned. The steering gear is arranged so that either rider may steer, two of the ordinary spade pattern handles being provided, each on the top of a vertical rod having at its lower end a pinion, which gears into a rack on one side of the steering rod. The box or other receptacle for carrying the goods is arranged upon springs in order to reduce the jolting caused by the inequalities of the road.

In order that my invention may be more clearly understood, reference is had to the accompanying sheets of illustrative drawings, in which—

Figure 2:
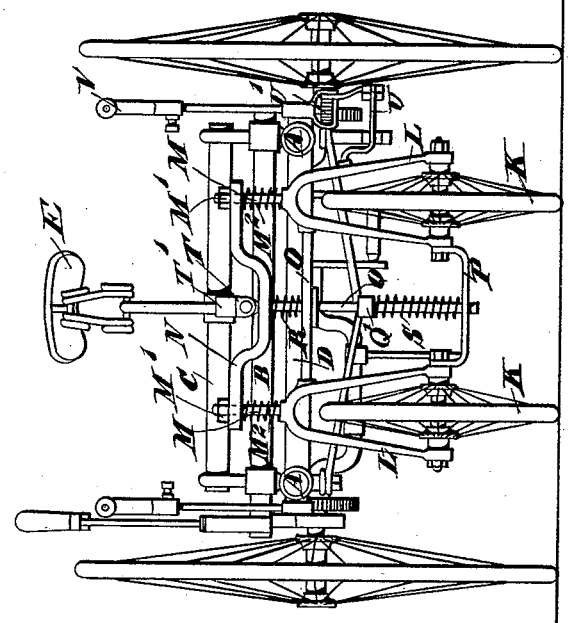

Figure 1 is a side and Fig. 2 a rear elevation of a cycle according to my invention.

The frame of the machine is formed of the longitudinal tubes A with stays A', extended for some distance in front of the axle of the driving wheel, and supported by the transverse tubes B, C and D.

E is the ordinary seat, arranged behind the driving axle, and supported by the transverse tube B, and F the second seat carried by the front tube C, the front driving shaft G being connected to the ordinary driving shaft H by the chain wheels I and chain J. The front rider will thus partially balance the weight of the ordinary rider and the articles carried and take some of the strain off the back steering wheels.

K K are the two steering wheels carried by forks L, having rods M at top passing through the cross piece N and attached thereto by the nuts M' and springs M². The forks L are connected together by a bar O and the axles of the wheels by a second bar P through which the rod Q fixed to the cross piece N passes. Springs R and S are situated on this rod, respectively between the bars N and O and between a collar Q' and the lower bar P. The rod Q is attached to the rod T by means of a knuckle joint, the rod T turning in a bearing T' at the end of the frame.

When one of the wheels K runs over a stone or other obstacle it will be raised from the ground and cause the whole arrangement to turn on the knuckle joint, allowing the other wheel to remain on the ground. Should both wheels encounter an obstacle they will give in a resilient manner. With this arrangement greater stability is obtained and jolting is minimized, and each of the steering wheels being capable of revolving separately, allowance is made for turning.

U is the steering rod attached to one of the forks and provided with racks on one side with which gear pinions U' fixed to the steering handles V, thus allowing both riders to steer. The box or other article W used for carrying the goods is mounted on springs W' in order to still further diminish vibration.

What I claim as my invention, and desire to secure by Letters Patent, is—

1. In a carrier cycle, two steering wheels K, each having a fork L, connected together, and supported by the cross piece N, to which they are attached by rods M and springs M², the cross piece N being connected to the bearing rod T by a knuckle joint, substantially as and for the purposes specified.

2. In a carrier cycle, the combination of two steering wheels K carried by forks L, connecting bars O, P, rods M connected to the crosspiece N by the nuts M' and spring M², rod Q provided with collar and attached to bearing rod T, by a knuckle joint and springs R and S the whole substantially as and for the purposes set forth.

3. In a carrier cycle, the combination of two steering wheels, having a frame capable of turning in two directions, one horizontally and the other vertically, and comprising forks L, cross piece N, rods M O and Q with collar Q', bar P, and springs M², R and S, with two seats E and F, carried respectively behind and in front of the driving axle, two sets of pedals and cranks, one mounted on the extended end of the frame, and two steering spindles provided with pinions U', which gear into racks on the steering rod, substantially as described and for the purposes specified.

In witness whereof I have hereunto set my hand, at London, this 18th day of May, 1892, in the presence of two witnesses.

JOHN WARRICK.

In presence of—
JAMES MILLER,
ALBERT EDWARD EWEN.